April 19, 1927.　　　　F. VOIGT　　　　1,625,175
MICROMETER
Filed June 17, 1926
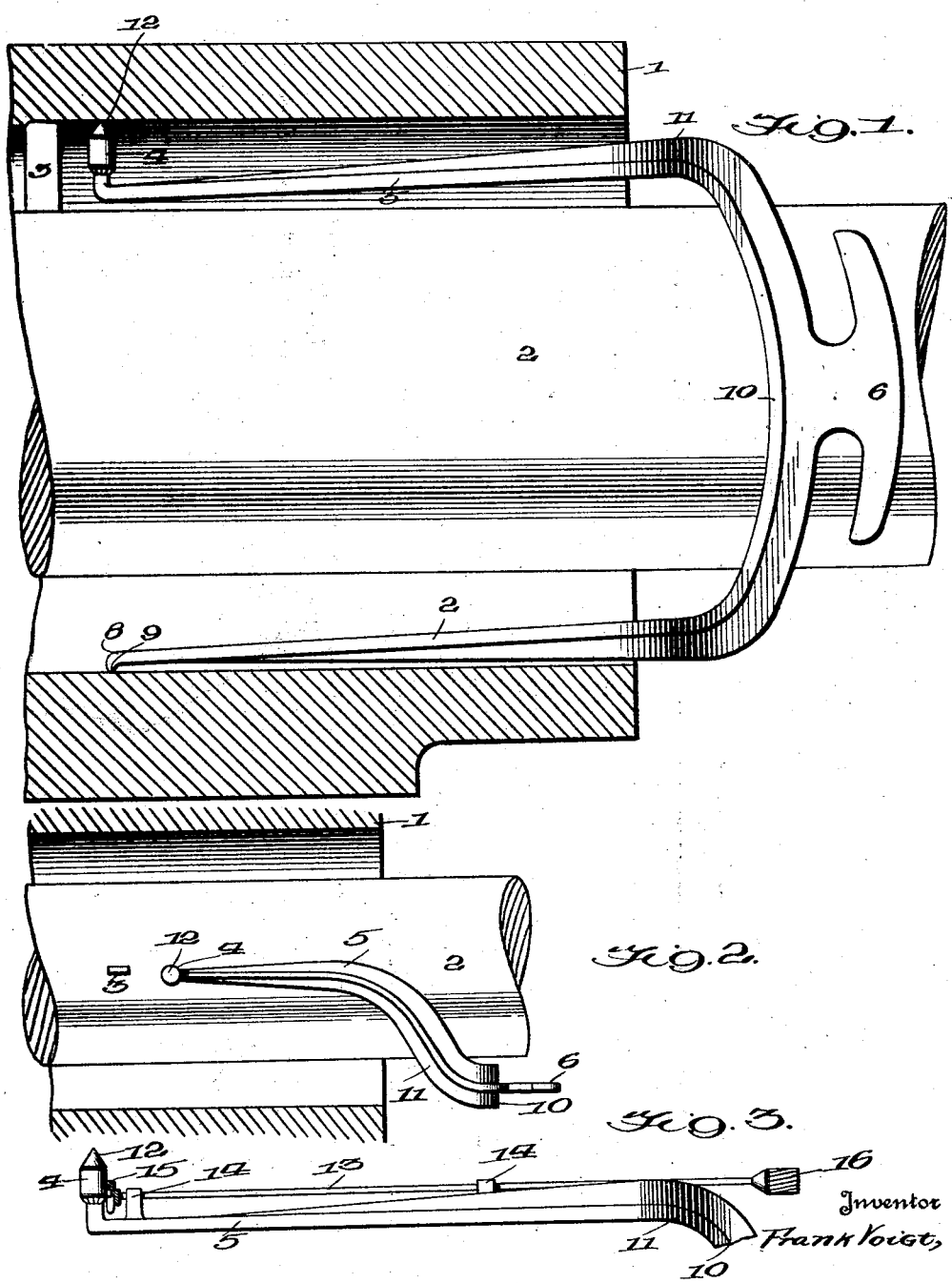
Inventor
Frank Voigt,
By Erwin Wheeler & Woodard
Attorneys Patented Apr. 19, 1927.

1,625,175

UNITED STATES PATENT OFFICE.

FRANK VOIGT, OF MILWAUKEE, WISCONSIN.

MICROMETER.

Application filed June 17, 1926. Serial No. 116,528.

This invention relates to improvements in micrometers, with particular reference to micrometers of the class adapted for measuring the internal diameters of tubular or cylindrical bodies.

The object of this invention is to provide means for measuring the internal diameter of a cylindrical body or bore while its interior surface is being machined, without removing the machining tool or boring bar.

The accompanying drawings show one embodiment of my invention in which Figure 1 illustrates my improved micrometer in use for measuring the internal diameter of a tubular member, a fragment of the latter being illustrated in full in operative position within the tubular member.

Figure 2 is a view of the same on a reduced scale taken at right angles to Figure 1.

Figure 3 is a detail view showing a modified form of construction in which means are provided for rotating the micrometer barrel while the measurement is being taken.

Like parts are identified by the same reference characters throughout the several views.

The tubular or cylindrical member 1 is illustrated in the process of having its internal surface machined by a boring mechanism including a boring bar 2 having a laterally projecting tool or cutter 3. The micrometer barrel 4 is mounted upon one arm 5 of a yoke shaped supporting member having a handle 6 and another arm 7 provided at its free extremity with an outwardly turned bearing finger 8, the axis of which is aligned with the axis of the micrometer barrel 4 and the tip of which is tapered or cylindrically curved to allow its extremity 9 to bear upon the interior surface of the tubular member 1. The inner ends of the arms 5 and 7 are preferably parallel and the arched or yoke portion 10 preferably has an elbowed connection with the arms 5 and 7 as indicated at 11 whereby the yoke and the handle 6 may be offset laterally although not necessarily at right angles to the arms 5 and 7.

In use, the yoke portion 10 straddles the boring bar 2 and allows the arms 5 and 7 to be inserted in the annular space between the boring bar and the cylinder or tube 1 along a longitudinal plane which includes the axis of the cylinder, although the arms will ordinarily stand in a plane more or less oblique thereto as clearly illustrated in Figure 2.

It is possible to utilize the micrometer as it is illustrated in Figures 1 and 2 by successive tests, with intermediate rotative adjustments of the barrel 4 to feed the bearing finger or gauge 12 outwardly, until a simultaneous contact of the bearing members 9 and 12 with the inner surface of the cylinder is obtained at diametrically opposite points, whereupon the reading of the micrometer gauge will indicate the true diameter of the cylinder, said gauge being preferably arranged to start from a zero point indicative of the normal distance between the extremities of the two bearing fingers when the bearing finger 12 is fully retracted.

It will, of course, be understood that the micrometer barrel and its finger adjusting mechanism will be constructed in accordance with the standard practice followed in the construction of micrometer gauges and a detailed illustration and description thereof is therefore deemed to be unnecessary.

In Figure 3 I have illustrated means for rotating the finger adjusting barrel 4 of the micrometer gauge without removing the tool from the tube. Various motion transmitting connections may be employed for this purpose, but I prefer to use the rotative rod 13 mounted in bracket bearings 14 on the arm 5 and provided with a friction wheel 15 at its inner end, which has a dished face permitting frictional contact with the barrel adjacent to its periphery, whereby rotation of the rod will be transmitted to the barrel 4. The rod can be rotated by means of the handle 16 located at its outer end near the elbowed connection 11 of the yoke 10.

It will, of course, be understood that the yoke and the arms 5 and 7 are sufficiently rigid to prevent them from yielding under any ordinary pressure exerted by the bearing fingers upon the walls of the cylinder. Also, that the distance between the extremity of the finger 12 and the inner surface of the corresponding extremity of the arm 5 will not exceed the length of the boring tool or cutter 3, taken along a line parallel with the axis of the cutter.

I claim:

1. A micrometer, comprising a yoke shaped handle portion, a set of substantially parallel rigid arms projecting respectively from the ends of the yoke shaped portion the yoke being in a plane oblique to a plane common to the axes of said arms, a fixed bearing finger upon the free end of one of said arms, and a micrometer gauge mounted on the free end of the other arm and having a bearing finger adapted for contact with the interior surface of a cylinder at a point diametrically opposite the bearing surface of the fixed contact finger.

2. A micrometer for measuring the diameter of a bore on opposite sides of a boring bar, comprising a yoke shaped member adapted to straddle the boring bar, a set of arms supported from said yoke shaped member in a position to extend into the bore on opposite sides of the boring bar, a fixed bearing finger carried by one of said arms, a micrometer gauge carried by the other arm and provided with a bearing finger adapted for contact with the surface which is being bored at a point diametrically opposite the contact of the fixed bearing finger with said surface, and actuating connections extending along one of said arms from the yoke to said gage.

3. A micrometer for measuring the diameter of a bore during a boring operation, comprising a yoke shaped member adapted to straddle the boring bar at a point exterior to the bore, in combination with a set of arms connected with the yoke shaped member and adapted to extend into the bore longitudinally thereof and along diametrically opposite lines, a bearing finger carried by one of said arms and a micrometer gage carried by the other arm and provided with a bearing finger.

FRANK VOIGT.